United States Patent [19]

Kawanaka et al.

[11] Patent Number: 5,085,052

[45] Date of Patent: Feb. 4, 1992

[54] OPERATING SPEED CHANGE-OVER DEVICE

[75] Inventors: Masanobu Kawanaka, Kobe; Youichi Kondo; Junichi Tabata, both of Akashi; Kimimasa Onda, Kobe, all of Japan

[73] Assignee: Shin Caterpillar Mitsubishi Ltd., Tokyo, Japan

[21] Appl. No.: 660,934

[22] Filed: Feb. 26, 1991

[30] Foreign Application Priority Data

Mar. 9, 1990 [JP] Japan .................. 2-23261[U]

[51] Int. Cl.$^5$ .................. F16D 31/02; F01B 3/00
[52] U.S. Cl. .................. 60/445; 91/506
[58] Field of Search ........... 60/445, 444, 465, 452; 91/506

[56] References Cited

U.S. PATENT DOCUMENTS

| | | | |
|---|---|---|---|
| 3,418,941 | 12/1968 | Mowbray | 91/506 X |
| 4,116,002 | 9/1978 | Knapp et al. | 60/445 |
| 4,212,164 | 7/1980 | Young | 60/465 X |
| 4,341,133 | 7/1982 | Sakamoto | 60/444 |
| 4,480,438 | 11/1984 | Breeden | 60/444 X |
| 4,528,813 | 7/1985 | Izumi et al. | 60/444 X |
| 4,559,778 | 12/1985 | Krusche | 60/452 X |
| 4,802,336 | 2/1989 | Mayr et al. | 60/452 X |
| 4,845,950 | 7/1989 | Metzner | 60/448 |
| 4,951,462 | 8/1990 | Graf | 60/444 |

Primary Examiner—Edward K. Look
Assistant Examiner—John Ryznic
Attorney, Agent, or Firm—Beveridge, DeGrandi & Weilacher

[57] ABSTRACT

An operating speed change-over device is equipped with an automatic speed change-over valve which opens and closes a pilot fluid line that connects a pilot port of a capacity change-over valve of a capacity-variable hydraulic motor to a pilot pump. The automatic speed change-over valve has one pilot port that is connected to a pressurized fluid feed line leading to the hydraulic motor and has another pilot port connected to the return fluid line of the hydraulic motor. The automatic speed change-over valve is changed over by an effective differential pressure between the two fluid lines.

2 Claims, 2 Drawing Sheets

OPERATING SPEED CHANGE-OVER DEVICE

FIELD OF THE INVENTION

This invention relates to an operating speed change-over device of a construction machine or the like which is capable of operating in a plurality of speeds, for example, at high or low-speed in two speeds using a variable displacement motor.

DESCRIPTION OF THE PRIOR ART

According to a conventional operating speed change-over device used for hydraulic operate vehicles such as excavators and the like, a capacity change-over valve (direction change-over valve) is controlled by an automatic speed change-over valve (pressure control valve) to change over the variable displacement motor (hereinafter simply referred to as a motor), and the hydraulic pressure fed to the motor is utilized as a change-over signal pressure for the automatic speed change-over valve (see, for example, Japanese Utility Model Publication No. 43260/1988).

When the signal pressure acting on the automatic speed change-over valve is smaller than a predetermined value in the above device, the motor is controlled to have a small capacity and to operate at a high speed. When the signal pressure exceeds a predetermined value, on the other hand, the automatic speed change-over valve is changed over to effect the change-over of the capacity change-over valve, so that the motor is controlled to have a large capacity and to operate at a low speed.

In the above conventional device in which only the hydraulic pressure fed to the motor is simply used as a change-over signal pressure for the automatic speed change-over valve, however, it is not possible to stably control the speed by the influence of the loss of pressure in the line caused by a change in the temperature.

That is, the hydraulic pressure fed to the motor (and the hydraulic pressure returning from the motor) is greatly lost in the line when the temperature is low, and the pressure becomes higher than that of under the condition of normal temperature. Therefore, when the change-over setting pressure is set to a given value to change the automatic speed change-over valve from a high-speed mode into a low-speed mode, the automatic speed change-over valve is changed over to make the low-speed operating when the temperature is low, but is not changed over under the normal temperature condition even under the same loaded condition on traveling since the change-over setting pressure is not gained. Hence, the high-speed operating is continued.

With the above-mentioned conventional device, therefore, it is not possible to stably control the speed. If the change-over setting pressure is lowered in an attempt to maintain stable control operation, it becomes difficult to effectively utilize the speed and power of the motor to a maximum possible degree.

SUMMARY OF THE INVENTION

The object of this invention therefore is to provide an improved operating speed change-over device which makes it possible to stably control the speed without being affected by the loss of pressure in the line (conduits) caused by a change in the temperature and to effectively utilize the speed and power of the motor to a maximum possible degree.

In order to achieve the above object according to this invention, there is provided an operating speed change-over device comprising a capacity change-over valve for changing over the capacity of a variable displacement motor, and an automatic speed change-over valve for opening and closing a pilot fluid line that connects a pilot port of the capacity change-over valve to a pilot pump, wherein the automatic speed change-over valve has one pilot port which is connected to a pressurized fluid feed line leading to the motor and has another pilot port which is connected to the return fluid line of the motor, and is changed over by an effective differential pressure between the two fluid lines.

DETAILED DESCRIPTION OF A PREFERRED EMBODIMENT

An embodiment of the improved operating speed change-over device according to this invention will now be described by reference to the accompanying drawings.

Figure 1:
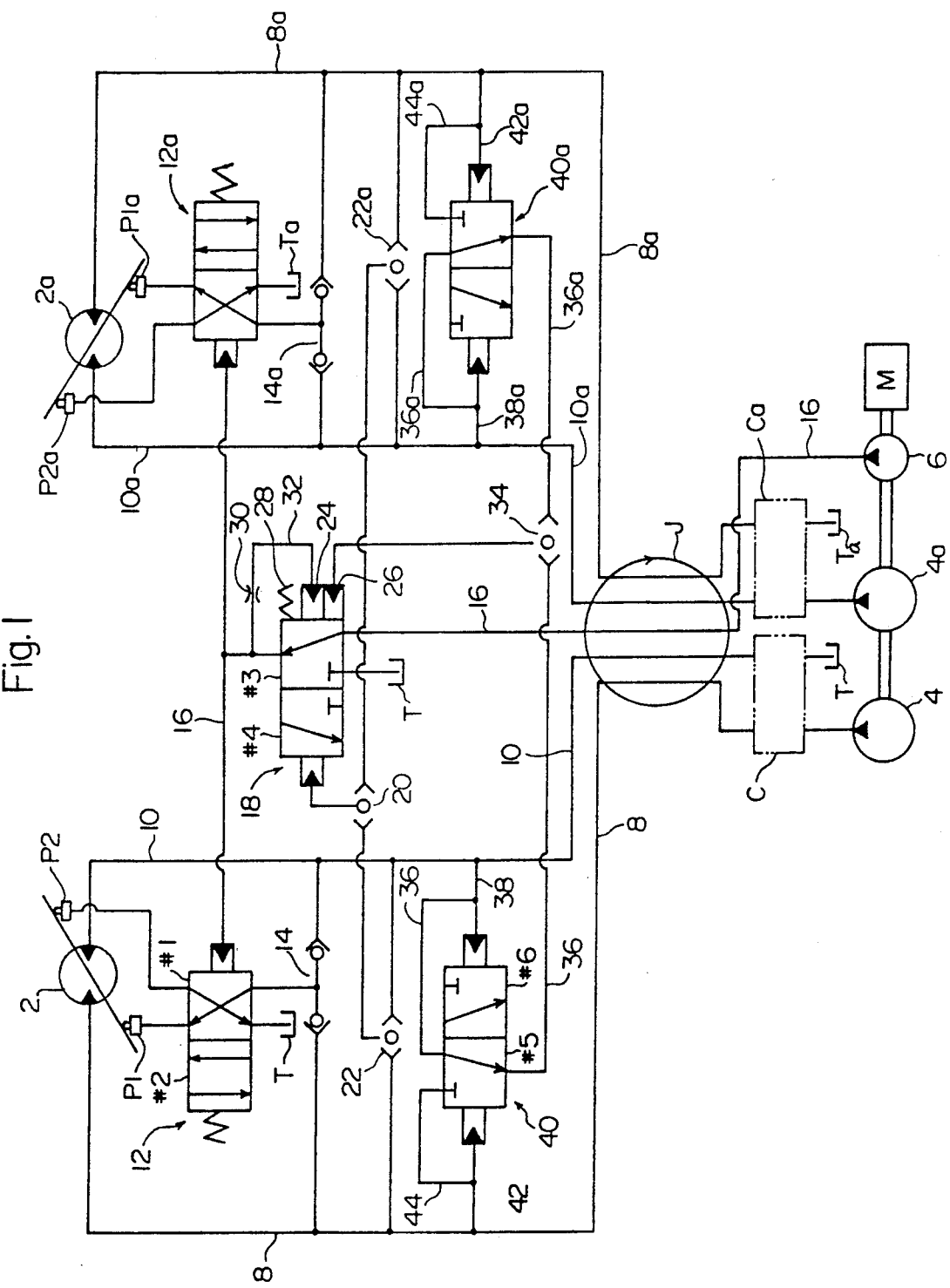
FIG. 1 is a diagram of a hydraulic pressure circuit in an operating speed change-over device according to an embodiment of this invention.

FIG. 1 is a diagram of a hydraulic pressure circuit in the operating speed change-over device according to an embodiment which is adapted to an excavator that is not shown, wherein two vehicle displacement motors (hereinafter simply referred to as motors) 2 and 2a are independently provided at right and left portions in the lower car body (not shown) of the excavator. Main pumps 4, 4a and a pilot pump 6 which are driven by an engine are provided on an upper swing frame (not shown) of the excavator.

The motor 2 and the main pump 4 are connected to each other via a pressurized fluid feed line 8 and a control valve C, and a return fluid line 10 of the motor 2 is coupled to a fluid tank T via the control valve C. Further, the motor 2a and the main pump 4a are connected to each other via a pressurized fluid feed line 8a and a control valve Ca, and a return fluid line 10a of the motor 2a is coupled to a fluid tank Ta via the control valve Ca.

As will be obvious from FIG. 1, the constitution and operation of the control hydraulic pressure circuits of the motors 2 and 2a are substantially the same in this embodiment. Therefore, explanation will be made in respect to only the side of the motor 2, and explanation about the side of the motor 2a will be limited to the portions related to each other. The portions of the side of the motor 2a that correspond to those of the side of the motor 2 are expressed by putting a to the reference numerals of the side of the motor 2 for easy comprehension of the relationships between the two sides.

The motor 2 is provided with a capacity change-over valve 12 for changing over the capacity of the motor 2 in two steps in this example. At the position #1 in FIG. 1, the capacity change-over valve 12 connects a piston P1 that controls the motor 2 to have a small capacity and to operate at a high speed, to the pressurized fluid feed line 8 and the return fluid line 10 via a shuttle valve 14, and connects a piston P2 that controls the motor 2 to have a large capacity and to operate at a low speed to the fluid tank T. A the position #2, on the other hand, the capacity change-over valve 12 connects the piston P2 to the pressurized fluid feed line 8 and the return fluid line 10 via the shuttle valve 14, and connects the piston P1 to the fluid tank T.

A pilot port provided on one side of the capacity change-over valve 12 is connected to the pilot pump 6 via a pilot fluid line 16. Further, a spring is provided on the other side thereof. The pilot fluid line 16 is opened and closed by an automatic speed change-over valve 18. The pilot fluid line 16 is further connected to a pilot port on one side of the capacity change-over valve 12a of the side of the motor 2a.

At a position #3 in FIG. 1, the automatic speed change-over valve 18 opens the pilot fluid line 16. At a position #4, the automatic speed change-over valve 18 closes the pilot fluid line 16 of the side of the pilot pump 6 and connects the pilot fluid line 16 of the side of the capacity change-over valve 12 to the fluid tank T.

A pilot port of the automatic speed change-over valve 18 is connected to other shuttle valves 22 and 22a via the shuttle valve 20. The shuttle valve 22 is connected to the pressurized fluid feed line 8 and to the return fluid line 10, and the shuttle valve 22a is connected to the pressurized fluid feed line 8a and to the return fluid line 10a.

The automatic speed change-over valve 18 is provided on the other side thereof with two pilot ports 24, 26 and a spring 28. The pilot port 24 is connected to the pilot fluid line 16 through a fluid line 32 that has an orifice 30. The pilot port 26 is connected to a shuttle valve 34 which is further connected to the return fluid lines 10 and 10a via fluid lines 36, 38 and fluid lines 36a, 38a. The fluid lines 36 and 36a are provided with low-pressure selective valves 40 and 40a.

One pilot port of the low-pressure selective valve 40 is connected to the return fluid line 10 via the fluid line 38, and another pilot port thereof is connected to the pressurized fluid feed line 8 via a fluid line 42. Here, the fluid line 42 is connected to a port of the low-pressure selective valve 40 via a fluid line 44. Due to the differential pressure between the pressurized fluid feed line 8 and the return fluid line 10, therefore, the low-pressure selective valve 40 is shifted to a position indicated by #5 in FIG. 1 thereby to open the fluid line 36.

Therefore, hydraulic pressures of the pressurized fluid feed line 8 and of the return fluid line 10 act on the automatic speed change-over valve 18 in the directions opposite to each other, so that its position is changed over when the effective differential pressure between the two hydraulic pressures reaches a predetermined value.

In FIG. 1, symbol J denotes a rotary joint. Devices such as pumps and the like shown below the rotary joint J in FIG. 1 are provided on the upper swing frame of the excavator, while devices such as motors and the like shown on the upper side are provided in the lower car body, and fluid lines are connected together via the rotary joint J to couple these devices.

Described below is the operation of the above-mentioned operating speed change-over device.

Condition of Small Capacity and High Operative Speed (see FIG. 1)

The pressurized fluid sent from the main pump 4 is fed to the motor 2 via pressurized fluid feed line 8 to drive the motor 2, and is returned to the fluid tank T via return fluid line 10. Due to the differential pressure between the pressurized fluid feed line 8 and the return fluid line 10, the low-pressure selective valve 40 remains at the position #5 to keep the fluid line 36 open.

When the excavator which is a hydraulic operate vehicles is under the loaded condition on traveling of a relatively small, the effective differential pressure between the pressurized fluid feed line 8 and the return fluid line 10 is smaller than the change-over setting pressure of the automatic speed change-over valve 18. Therefore, the automatic speed change-over valve 18 is shifted to the position #3 chiefly by action of the spring 28 to open the pilot fluid line 16. As the pilot fluid line 16 is opened, a pilot pressure is added to the pilot port 24 via fluid line 32 to help hold the same position.

The capacity change-over valve 12 is shifted to the position #1 due to the pilot pressure that acts thereupon via pilot fluid line 16. The hydraulic pressure of the pressurized fluid feed line 8 acts on the piston P1 via shuttle valve 14. Therefore, the motor 2, i.e. the excavator, operates maintaining a small capacity and a high speed.

Figure 2:
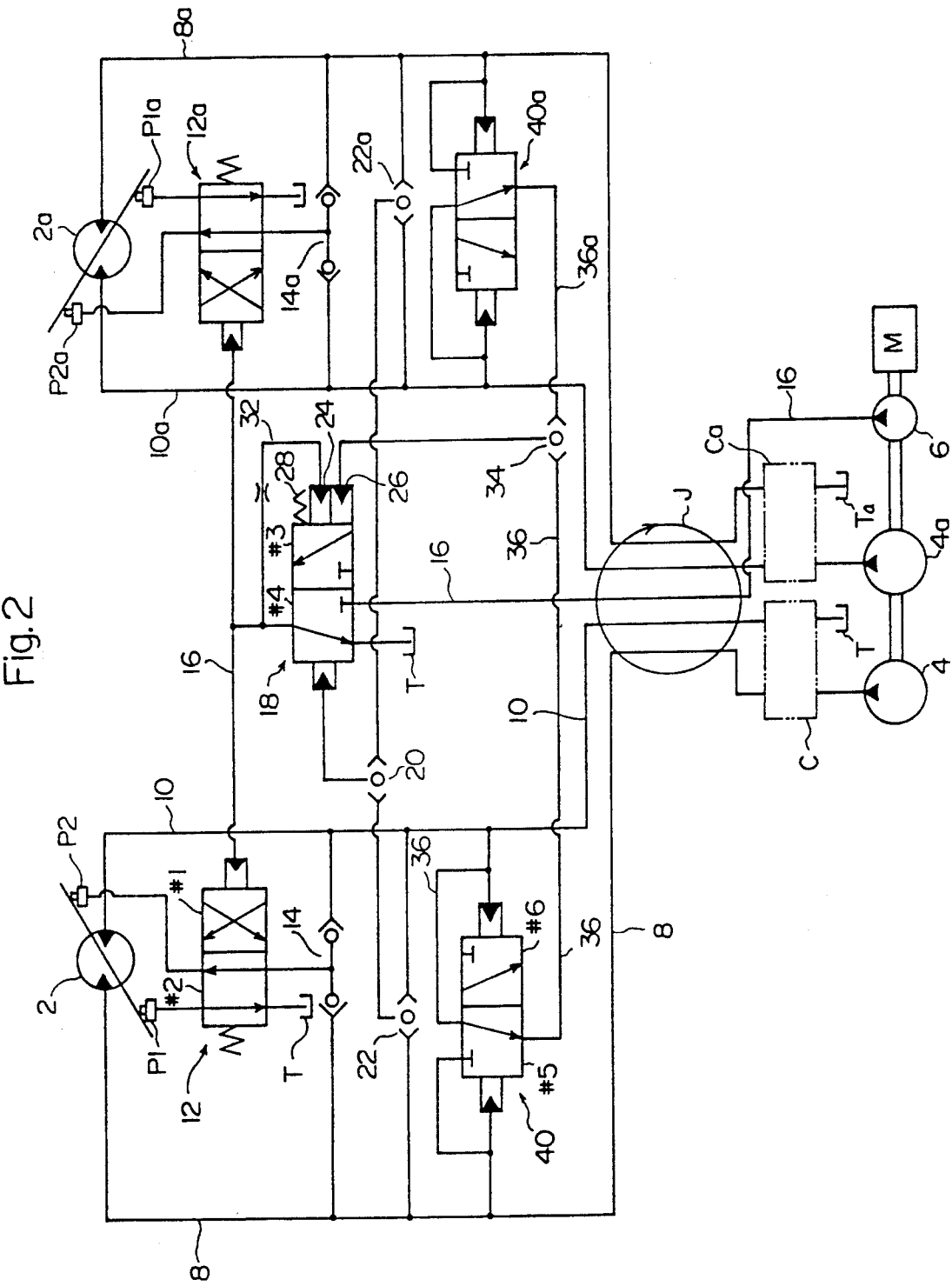
FIG. 2 is a diagram illustrating another operation mode of FIG. 1.

Condition of Large Capacity and Low Operating Speed (see FIG. 2)

The hydraulic pressure in the pressurized fluid feed line 8 increases with an increase in the loaded condition on traveling of the excavator. As a result, the automatic speed change-over valve 18 is shifted to the position #4 when the effective differential pressure between the pressurized fluid feed line 8 and the return fluid line 10 reaches the change-over setting pressure at which the automatic speed change-over valve 18 is changed from the high-speed mode into the low-speed mode. Therefore, the side of the pilot pump 6 of the pilot fluid line 16 is closed, and the side of the capacity change-over valve 12 side is connected to the tank T. As a result, the capacity change-over valve 12 is shifted to the position #2, and the hydraulic pressure of the pressurized fluid feed line 8 acts on the piston P2 via shuttle valve 14. Therefore, the motor 2, i.e. the excavator, operates maintaining a large capacity and a low speed.

Now, if the loaded condition on traveling of the excavator decreases and the effective differential pressure between the pressurized fluid feed line 8 and the return fluid line 10 decreases to a setting pressure at which the low-speed mode is changed into the high-speed mode, the automatic speed change-over valve 18 is shifted to the position #3 and the operating speed change-over device assumes the small capacity and high operating speed condition that is shown in FIG. 1.

Here, the shuttle valves 20 and 34 so work that the side of either the motor 2 or the motor 2a having a higher hydraulic pressure than the other will act upon the automatic speed change-over valve 18. Moreover, the afore-mentioned operations are carried out substantially in the same manner even when the motors 2 and 2a are in operation modes which are different from each other. Furthermore, the same also holds true even when the motors 2 and 2a are in reverse operations.

As described above, according to this invention which utilizes the effective differential pressure between the hydraulic pressure fed to the motor and the hydraulic pressure of the return fluid as a change-over signal pressure for the automatic speed change-over valve, it is allowed to maintain stable speed control operation without being affected by the loss of pressure in the line that is caused by a change in temperature.

That is, the effective differential pressure between the hydraulic pressure fed to the motor and the hydraulic pressure of the return fluid makes it possible to perceive the same loaded condition on traveling irrespective of a change in temperature and, as a result, the speed and power of the motor can be effectively utilized to a maximum possible degree.

Though the invention was described above in detail by way of an embodiment, it should be noted that the invention is in no way limited to the above embodiment only but can be varied or modified in a variety of other ways without departing from the scope of the invention.

What we claim is:

1. An operating speed change-over device comprising a capacity change-over valve for changing over the capacity of a variable displacement motor, and an automatic speed change-over valve for opening and closing a pilot fluid line that connects a pilot port of said capacity change-over valve to a pilot pump, wherein said automatic speed change-over valve has one pilot port which is connected to a pressurized fluid feed line leading to said motor and has another pilot port which is connected to the return fluid line of said motor, and is changed over by an effective differential pressure between the two fluid lines.

2. An operating speed change-over device according to claim 1, wherein said another pilot port of said automatic speed change-over valve is connected to said return fluid line via a low-pressure selective valve, one pilot port of said low-pressure select valve is connected to said pressurized fluid feed line, another pilot port thereof is connected to said return fluid line, and said low-pressure selective valve is so controlled as to connect said return fluid line to said another pilot port of said automatic speed change-over valve depending upon a differential pressure between said pressurized fluid feed line and said return fluid line.

* * * * *